United States Patent
Ishizu et al.

(10) Patent No.: US 8,675,503 B2
(45) Date of Patent: Mar. 18, 2014

(54) COMMUNICATION TERMINAL AND COMMUNICATION NETWORK SYSTEM

(75) Inventors: Kentaro Ishizu, Koganei (JP); Homare Murakami, Koganei (JP); Goh Miyamoto, Koganei (JP); Ha Nguyen Tran, Koganei (JP); Stanislav Filin, Koganei (JP); Hiroshi Harada, Koganei (JP)

(73) Assignee: National Institute of Information and Communications Technology, Tokyo (JP)

( * ) Notice: Subject to any disclaimer, the term of this patent is extended or adjusted under 35 U.S.C. 154(b) by 823 days.

(21) Appl. No.: 12/510,490

(22) Filed: Jul. 28, 2009

(65) Prior Publication Data

US 2010/0020763 A1 Jan. 28, 2010

(30) Foreign Application Priority Data

Jul. 28, 2008 (JP) ................................. 2008-193199

(51) Int. Cl.
*G01R 31/08* (2006.01)
*H04L 12/28* (2006.01)
*H04W 4/00* (2009.01)
*H04W 36/00* (2009.01)

(52) U.S. Cl.
USPC ........... 370/248; 370/252; 370/254; 370/329; 455/432.1; 455/436

(58) Field of Classification Search
USPC ......... 370/248, 252, 254–255, 277–278, 282, 370/329; 455/405, 432.1, 436
See application file for complete search history.

(56) References Cited

U.S. PATENT DOCUMENTS

| 7,058,059 | B1 * | 6/2006 | Henry et al. ................ 370/395.1 |
| 2002/0098864 | A1 * | 7/2002 | Mukai et al. ................... 455/552 |
| 2005/0037755 | A1 * | 2/2005 | Hind et al. .................. 455/435.3 |
| 2005/0059397 | A1 * | 3/2005 | Zhao .......................... 455/435.2 |
| 2005/0239443 | A1 * | 10/2005 | Watanabe et al. ........... 455/414.1 |
| 2005/0282544 | A1 * | 12/2005 | Oommen et al. .......... 455/432.1 |
| 2006/0009216 | A1 * | 1/2006 | Welnick et al. ............... 455/434 |

(Continued)

FOREIGN PATENT DOCUMENTS

| JP | 2003-152732 | 5/2003 |
| JP | 2006-128980 | 5/2006 |
| JP | 2007-184850 | 7/2007 |

OTHER PUBLICATIONS

G. Wu, P. Havinga and M. Mizuno, "MIRAI Architecture for Heterogeneous Networks," IEEE Comm. Mag., 2002, pp. 126-134, Feb. 2002.

(Continued)

*Primary Examiner* — Redentor Pasia
(74) *Attorney, Agent, or Firm* — Richard L. Sampson

(57) ABSTRACT

Embodiments of the invention enable a large number of wireless communication networks to be efficiently used while the size of a device operated by a user is reduced and power is saved by providing a communication terminal whose connection with different wireless communication networks can be dynamically reconfigured. A communication terminal whose connection with a plurality of wireless communication networks can be dynamically reconfigured is provided with a data communication aggregation device, a communication application executing device, and a local communication path therebetween. The data communication aggregation device interfaces with the plurality of wireless communication networks and communicates with the communication application executing device through the local communication path. The communication application executing device executes an application for communicating with an outside communication network.

9 Claims, 10 Drawing Sheets

(56) References Cited

U.S. PATENT DOCUMENTS

| | | | |
|---|---|---|---|
| 2006/0146766 A1* | 7/2006 | Nakajima et al. | 370/338 |
| 2007/0160071 A1* | 7/2007 | Overtoom et al. | 370/401 |
| 2007/0243832 A1* | 10/2007 | Park et al. | 455/73 |
| 2007/0248061 A1* | 10/2007 | Poston | 370/338 |
| 2007/0255797 A1* | 11/2007 | Dunn et al. | 709/217 |
| 2008/0019333 A1* | 1/2008 | Kharia et al. | 370/338 |
| 2008/0039102 A1* | 2/2008 | Sewall et al. | 455/445 |

OTHER PUBLICATIONS

M. Inoue, K. Mahmud, H. Murakami, M. Hasegawa and H. Morikawa, "Novel Out-Of-Band Signaling for Seamless Interworking between Heterogeneous Networks," IEEE Wireless Commun., 2004, pp. 56-63, vol. 11, No. 2, Apr. 2004.

H. Harada, "Software defined radio prototype toward Cognitive Radio Communication Systems," IEEE Dyspan 2005, vol. 1, pp. 539-547, Not later than Dec. 2005.

"Internet Magazine", Impress R&D, pp. 86-89, Feb. 2006, http://i.impressrd.jp/files/images/bn/pdf/im200602-085-strategy.pdf.

Go Miyamoto, et al., "Cognitive Wireless Cloud (2) ~ Data Collection Method for Finding Wireless Resources" IEICE Technical Report, Technical Committee on Software Radio, Mar. 2007, pp. 29-34.

Yoshia Saito, Mikio Hasegawa, Yoshitoshi Murata, "Cognitive Wireless Cloud (3) ~ High-speed End-To-End QoS Measuring Method", IEICE Technical Report, Technical Commitee on Software Radio, Mar. 2007, pp. 35-42.

H. N. Tran, M. Hasegawa, Y. Murata, "Resource Reservation Scheme for Mobile Users in Cognitive Wireless Cloud" IEICE Technical Report, Technical Committee on Software Radio, Mar. 2007, pp. 81-86.

Online Reference, Port Numbers, http://www.iana.org/assignments/port-numbers, Jun. 2009.

* cited by examiner

COMMUNICATION TERMINAL AND COMMUNICATION NETWORK SYSTEM

TECHNICAL FIELD

The present invention relates to a communication terminal capable of communication while presence of or connection method with a plurality of wireless communication networks is dynamically reconfigured and a communication network system provided with the same and more particularly to a technology for dynamically reconfiguring the wireless communication network to be uses with a simple configuration.

BACKGROUND ART

Various wireless access systems such as cellular phone, wireless LAN, and PHS have spread and a wireless MAN service such as WiMAX (Worldwide Interoperability for Microwave Access) is going to start.

In order to effectively use such an access system, research and development on a technology to make handover to a different type of wireless network in a seamless way has progressed (See Non-Patent Documents 1 and 2).

Also, as disclosed in Non-patent Document 3, a software radio technology to enable connection to a different wireless interface in order to switch a different wireless system has been studied.

On the basis of these technologies, limited wireless resources (frequency, wireless infrastructure) and network resources can be efficiently utilized by switching to an optimal one according to the situation of the wireless network. Also, as a result, throughput or capacity in total can be improved, and use efficiency of the frequency is improved.

On the other hand, since mobile communication terminals such as PDA, cellular phone, and small-sized laptop computer are provided with a plurality of wireless communication methods, a user can select and switches to an optimal one from those methods or use some at the same time so as to increase the communication speed and to conduct wireless communication.

However, different data communication devices should be used actually according to the method or wireless network operator in many cases.

For example, suppose such a case that one wireless network operator provides a data communication device of a USB interface, while another wireless network operator provides a data communication device of a PCMCI interface.

As the result of progress of the software wireless technology, it is technically possible to use only a single data communication device while switching is made to a plurality of communication methods, but it is not considered to have spread among general users.

Also, it is technically possible to make connection to a plurality of wireless network operators with a single data communication device, but each wireless network operator provides their exclusive data communication device in many cases. Therefore, it becomes necessary to connect a plurality of data communication devices to a communication terminal in general.

At this time, if there are many wireless network operators and communications methods to be used and the number of required data communication devices is large, data communication ports of the communication terminal are all used up and other devices cannot be connected to the terminal or there might be a case in which even the data communication ports are not sufficient for all the devices to be connected in the first place.

Also, the mobile communication terminal is designed suitable for portability, but connection with the data communication devices increases the volume or causes protrusions, which damages portability of the mobile communication terminal.

Moreover, since the data communication device usually executes processing such as flow control or error correction in addition to wireless transmission/receiving, the device holds a larger proportion in power consumption as compared with the main body of the mobile terminal or the other devices connected to that in many cases, and there is a problem that a battery operating time, which is important for the mobile terminal, is reduced.

Non-Patent Document 4 introduces a device called personal media gateway. Using this, a function to communicate with a base station can be separated from the mobile terminal, and the device functions as an access point to a plurality of the mobile terminals. However, incorporation of functions such as selection of the above-mentioned data communication device, connection, disconnection, aggregation of bands, discrimination and sorting of communication contents and the like is not assumed, and the device merely performs relaying of data communication.

Technologies relating to the present invention have been examined by the applicants of the present application as a technology relating to collection of wireless information. For example, Non-Patent Document 5 as a technology for a terminal to autonomously recognize a usable network, Non-Patent Document 6 as a technology to obtain the respective network QoS information on a real-time basis, and Non-Patent Document 7 as a technology to make efficient wireless resource reservation for seamless handover which can handle high-speed movement are disclosed, respectively.

Related Patent Documents include Patent Document 1 which discloses a software wireless communication device. This software wireless communication device can handle a plurality of frequencies or wireless methods by switching software since a received radio wave is along-digital converted by an AD converter once, and demodulation or the like is performed by a digital signal processor or micro processor and software.

Also, Patent Document 2 discloses a cognitive communication system in which a database device holding information on a use state of wireless channels is connected to each base station provided in the respective wireless access networks and the database device having a database of frequencies used by an existing wireless access network for integrating the database device into each base station side is installed.

In order to manage wireless access devices with different communication methods or management methods in an integrated manner, standardized functions and a communication interface between different devices are required. However, such a function is realized in the prior art by devices developed specially for the wireless system, in which functions in the devices are different and moreover, an interface between the devices is not standardized, and there is a problem that a general-purpose device cannot be developed.

Patent Document 3 discloses an integrated relay system in which plural pieces of relay system monitoring information can be managed by a single parent station device of the relay system in an integrated manner. This relay system performs relaying between a base station and a portable terminal in a wireless communication system, but this is a system for relaying in a radio-wave dead zone such as a tunnel and not for using plural types of wireless communication systems by dynamically reconfiguring them.

Non-Patent Document 1: G. Wu, P. Havinga and M. Mizuno, "MIRAI Architecture for Heterogeneous Networks," IEEE Comm. Mag., pp. 126-134, 2002

Non-Patent Document 2: M. Inoue, K. Mahmud, H. Murakami, M. Hasegawa and H. Morikawa, "Novel Out-Of-Band Signaling for Seamless Interworking between Heterogeneous Networks," IEEE Wireless Commun., Vol. 11, No. 2, pp. 56-63, 2004

Non-Patent Document 3: H. Harada, "Software defined radio prototype toward Cognitive Radio Communication Systems," IEEE Dyspan 2005, Vol. 1, pp. 539-547, 2005

Non-Patent Document 4: "Internet Magazine", Impress R&D, pp. 86-89, February, 2006, http://i.impressrd.jp/files/images/bn/pdf/im200602-085-strategy.pdf Non-Patent Document 5: Go Miyamoto, Kentaro Ishizu, Mikio Hasegawa, Yoshitoshi Murata, "Cognitive Wireless Cloud (2)~Data Collection Method for Finding Wireless Resources" IEICE Technical Report, Technical Committee on Software Radio, March 2007

Non-Patent Document 6: Yoshia Saito, Mikio Hasegawa, Yoshitoshi Murata, "Cognitive Wireless Cloud (3)~High-speed End-To-End QoS Measuring Method" IEICE Technical Report, Technical Committee on Software Radio, March 2007

Non-Patent Document 7: H. N. Tran, M. Hasegawa, Y. Murata, "Resource Reservation Scheme for Mobile Users in Cognitive Wireless Cloud" IEICE Technical Report, Technical Committee on Software Radio, March 2007

Patent Document 1: Japanese Patent Laid-Open No. 2003-152732

Patent Document 2: Japanese Patent Laid-Open No. 2007-184850

Patent Document 3: Japanese Patent Laid-Open No. 2006-128980

SUMMARY OF INVENTION

Technical Problem

The present invention was made in view of the problems of the above prior art and has an object to provide a communication terminal capable of dynamic reconfiguration of connection with different wireless communication networks and to provide a technology that can efficiently use a large number of wireless communication networks while the size of a device operated by a user can be reduced and power is saved.

Solution to Problem

The present invention provides the following communication terminal in order to solve the above problems.

That is, according to an invention described in claim 1, a communication terminal capable of dynamic reconfiguration of presence/absence or method of connection to a plurality of wireless communication networks, provided with a data communication aggregation device, a communication application executing device and a local communication path for connecting the data communication aggregation device and the communication application executing device is provided.

In the following embodiment, the presence of and switchable method of connection are collectively called a connection method or the like.

The data communication aggregation device of the communication terminal is provided with a single or a plurality of communicating means corresponding to a plurality of wireless communication networks configured physically or logically and a first local communicating means for communicating with the communication application executing device through the local communication path.

Specifically, the data communication aggregation device has functions of selection of communicating means, connection, disconnection, aggregation of bands, discrimination and sorting of communication contents in the communicating means and the like.

The communication application executing device of the communication terminal is provided with a second local communicating means for communicating with the data communication aggregation device through the local communication path and an application executing means for executing at least an application communicating with an outside communication network.

The connection method of the present invention includes a frequency or modulation method, and communication methods such as WiFi (compatible Wireless Fidelity, IEEE 802.11b standard) and WiMAX (Worldwide Interoperability for Microwave Access, IEEE 802.16 standard) used in communication. Targets of the reconfiguration include bands to be used, a level for communication quality guarantee and the like. The reconfiguration of the present invention can be also applied to arbitrary setting of the communication terminal and the network and change of parameters as above.

According to an invention described in claim 2, the above data communication aggregation device is provided with a connection policy information table stored in storage means, communication network reconfiguration management means for selecting a connection method of a wireless communication network or the like on the basis at least of the connection policy information, and a communication network reconfiguration executing means for reconfiguring connection to the selected connection method or the like.

According to an invention described in claim 3, the above communication network reconfiguration management means is provided with a connection policy information creation portion for creating the connection policy information table, using requirement information inputted from input means or stored in the storage means relating to a predetermined communication parameter in the communication network, on the basis of the requirement information.

According to an invention described in claim 4, the above predetermined communication parameter is one of or combination of a communication speed, a communication amount, a line load, a packet loss rate, communication delay, jitter, radio-wave intensity, communication fee, or a value calculated by a predetermined calculation equation from values of these parameters.

According to an invention described in claim 5, the data communication aggregation device is provided with a communication network measurement information collecting means for extracting at least any of the information on the communication parameters from each communication network. And the above communication network reconfiguration management means is provided with a connection policy information evaluation portion for evaluating contents of the connection policy information table on the basis of the information collected by the communication network measurement information collecting means, and the connection policy information creation portion updates the connection policy information table according to the evaluation.

According to an invention described in claim 6, the data communication aggregation device is provided with frequency measuring means for measuring a use state of the frequency by each communication network, and the above connection policy information creation portion updates the connection policy information table according to the use state of the frequency.

According to an invention described in claim 7, it may be so configured that a plurality of the communication application executing devices are provided in the single data communication aggregation device in a communication terminal of the present invention so that the data communication aggregation device operates for each communication application executing device.

The present invention can be provided as a communication network system provided with a communication terminal described in any of the above claims 1 to 7. The communication network system is constituted by the communication terminal as well as the above plurality of wireless communication networks and a plurality of server devices connected through the wireless communication network.

Advantageous Effects of Invention

The present invention has the following advantages by providing the above configuration.

According to the present invention, the data communication aggregation device for accommodating a plurality of data communication devices is newly introduced, and a function relating to control of the plurality of data communication devices is separated from the communication application executing device held by a user and provided.

In a prior-art method, since a mobile terminal directly accommodates a data communication device, the number of data communication devices that can be accommodated is limited, and there are problems of lowering in portability and increase in power consumption. By means of the present invention, the functions such as selection, connection, disconnection, band aggregation, discrimination and sorting of the communication contents and the like of the data communication device can be separated from the application executing device, and there is no more need to introduce a new function into the application executing device.

Also, if a prior-art mobile terminal is used, by using the data communication aggregation device of the present invention and an existing communication module in the mobile terminal for connection, the above-mentioned functions can be made available.

DESCRIPTION OF EMBODIMENTS

An embodiment of the present invention will be described below on the basis of an example shown in the attached drawings. The embodiment is not limited to the following.

FIG. 1 shows an entire configuration of a network system according to the present invention. A communication terminal (20) connected to base stations (access points) (13) (14) (15) of outside networks (10) (11) (12) such as a 3G cellular phone line network, PHS, and wireless LAN through a wireless communication network (16) has a characteristic.

The communication terminal (20) is not configured with a portion for data communication and a portion for execution processing of an application integrally as in the prior-art mobile terminal but is configured separately into a data communication aggregation device (21) and a communication application executing device (22).

The data communication aggregation device (21) and the communication application executing device (22) are connected by a wired or wireless local communication path (23).

In the data communication aggregation device (21), a plurality of communicating means capable of communicating with each of wireless communication networks (16) formed physically or logically are disposed, and an antenna or a communication module may be substantially provided as necessary or configuration may be such that the plurality of wireless communication networks are handled by a single hardware resource using a known software modem technology or the like.

As mentioned above, an antenna and a communication module are mounted on the data communication aggregation device by separating the data communication aggregation device from the communication application executing device, while it is only necessary to provide minimum local communicating means to be connected to the data communication aggregation device in the communication application executing device. As a result, the problem of increase in a capacity or power consumption if a plurality of antennas or communication modules are provided can be solved at a terminal actually held by a user.

The local communication path is preferably constituted by wireless communication such as wireless LAN or Bluetooth (registered trademark) but may be connection by a wired LAN or a cable.

By integrating different types of wireless communication networks in the data communication aggregation device and dynamically re-setting them, a use efficiency of the frequency, load distribution of network traffic, communication quality demanded by users and applications and the like can be improved.

Example 1

FIG. 2 is a configuration diagram of the data communication aggregation device (21) of the present invention. The data communication aggregation device (hereinafter referred to as the device) (21) may be realized by a known personal computer, server computer and the like or a network router may be provided with the function of the present invention. If the device is constituted by a personal computer, a CPU (210) for executing processing in collaboration with a memory, not shown, a first communication module (211) for communicating with each of a plurality of types of wireless communication networks, a second communication module (212), a third communication module (213), input means such as a keyboard (214), a local communication module (215) for communicating with the communication application executing device (22), external storage means such as a hard disk (216) and the like are provided.

The first to third communication modules (211 to 213) are communication modules for connection with a wireless communication network such as a cellular phone communication card, PHS data communication card, wireless LAN card and the like and are widely offered in the form of CF card, PCI card, USB connection device and the like.

In general, a single antenna (211a) is provided for one communication module such as the first communication module, but if frequencies in use are close, the antenna (212a) may be shared as in the second communication module (212) or the third communication module (213).

The local communication module (215) is, as mentioned above, a device constituting a local communication path and can be constituted by a wireless LAN adapter or Bluetooth adapter. The local communication module (215) may be provided separately from each of the above communication modules (211 to 213), but actually, it may be shared both for connection with an outside network and for local connection. The same applies to an antenna (215a).

It is needless to say that this embodiment is an example of the invention, and the number and configuration of the communication module can be determined arbitrarily. It is also possible to handle a plurality of wireless communication networks with a single communication module by means of software as mentioned above.

The simplest configuration of the present invention is that a link is established if connection is possible with the wireless communication network in each of the communication modules (211 to 213) and all the bands are integrated and used. A method for integrating and using communication networks which are different physically and logically is known, and it is only necessary to provide a link integration processing portion, not shown, in the CPU (210) so as to constitute a bundle of links in this case.

A configuration of this device (21) including a technology to select an optimal network from connectable wireless communication networks and to use it in combination will be disclosed below, not the simplest method.

Here, in the CPU (210), two processing means, namely, communication network reconfiguration management means (2101) and communication network reconfiguration executing means (2102) are realized.

The former (2101) is provided with a network control portion (2101a) for commanding execution of network reconfiguration on the basis of connection policy information and a connection policy information creation portion (2101b) for creating connection policy information.

The latter (2102) is provided with a network reconfiguration execution processing portion (2102a) for carrying out connection/disconnection with a communication network, setting change of connection parameters and the like by a known method according to a command from the network control portion (2101a).

The hard disk (216) stores a connection policy information table (2161) and requirement information (2162) referred to by the connection policy information creation portion (2101b). The requirement information (2162) can be directly inputted by a user from the keyboard (214) and does not have to be provided.

FIG. 4 shows a configuration of the communication application executing device (22) according to the present invention. It is also convenient that this device (22) is constituted by a known personal computer, cellular phone terminal or PDA. The device may be provided with a communication module that can be connected to a plurality of wireless communication networks, or an existing mobile terminal may be used.

This device (22) is constituted by a local communication module (220) constituting a local communication path with the data communication aggregation device (21), a CPU (221), input means (222) such as a keyboard, a hard disk, and a memory (223). The CPU (221) executes and processes a program of execution software (223a) stored in the hard disk or the like by an application execution processing portion (221a). This method is known and will not be described in detail here.

In the present invention, it is supposed that a network communication is used in the application. For example, such a configuration is known that the execution software (223a) is software to reproduce moving images and moving-image data obtained from an external server (not shown) through a communication network is reproduced. Other than that, it may be such a configuration that the execution software (223a) is a web browser and received data is displayed on a monitor, not shown.

The type of the execution software is arbitrary.

In the present invention, data transmitted/received by the data communication aggregation device (21) through the wireless communication network is used by the communication application executing device (22) through the local communication modules (215) (220).

Subsequently, the communication method will be described in detail. First, the data communication aggregation device (21) performs processing shown in FIG. 4.

First, the connection policy information creation portion (2101b) of the communication network reconfiguration management means creates connection policy information by referring to the requirement information (2162).

Then, the network control portion (2101a) makes selection of the communication network (S11) on the basis of the connection policy information (2161).

Then, the network reconfiguration execution processing portion (2102a) having received a command from the network control portion (2101a) executes and processes (S12) reconfiguration of the communication network.

The connection policy information creation processing (S10) will be described. In this processing (S10), the connection policy information for determining which communication network is to be reconfigured, considering the requirement information (2162), which is priority specified by the user, is created. In the present invention, the connection policy information can be improved from an evaluation of a communication state when the communication is actually conducted, and this will be described as another example.

The requirement information (2162) and the connection policy information (2161) are defined in relation with communication parameters. What communication parameters are suitably used was examined.

For the requirements as wireless information, five viewpoints, that is, (1) wireless information, (2) communication quality, (3) stability, (4) cost, and (5) power consumption of the terminal are important.

(1) Wireless Information (RF)

In order for a terminal to use a wireless resource, the terminal is required to be within a cover area of the wireless resource in the first place. Which wireless resource can be used when a certain terminal is located at a certain position can be searched by the terminal itself through scanning.

In the present invention, it is simple and convenient to obtain information on whether or not each of the communication modules (211 to 213) is capable of communication.

(2) Communication Quality (End-to-End QoS)

Since the required communication quality is different depending on the application to be used, not only the binary value information on whether or not the connection is possible as described in (1) but finer QoS information is needed. The QoS information includes delay, jitter, loss rate, and usable band.

Particularly, if a new terminal interrupts in a crowded wireless resource, the communication quality of other terminals having already used the wireless resource is badly affected, and prior estimation with accuracy of to what degree the new terminal can use the band is considered to be important.

The usable band information is also necessary in achieving the object of the system which improves frequency use efficiency through load distribution of the entire network.

(3) Stability

In the wireless communication in which the communication quality dynamically changes, not only the instantaneous QoS information stated in (2) but also its stability is an important parameter. For example, there can be a case in which a narrow but stable band is more preferable than a wireless resource which can use a wide band temporarily.

As a specific example, if switching of wireless resources is repeated with movement of a user while communication is continued, there can be a request that the number of switching times should be reduced as much as possible.

For such a purpose, it is effective to estimate time during which the wireless resource can be continuously used.

(4) Cost

There can be a case in which a lower communication fee is given a higher priority than QoS guarantee depending on a user or an application. The communication fee is also an important parameter in selecting a wireless resource from the viewpoint of satisfaction of the user.

(5) Power Consumption of Terminal

If a battery of a terminal runs out during use of the wireless communication, communication is no longer possible, and how much power consumption is needed for the communication is also an important factor in selection of the wireless resource.

First, one or more of these requirements are used as a requirement of a user. Specifically, priority ranks may be defined for each requirement through input by a user from the keyboard (214). Alternatively, one of the requirements may be selected such as "emphasis on cost", "emphasis on communication quality" and the like.

Moreover, it may be so configured that the requirement is automatically defined in an application in use. For example, such processing may be implemented that when an application requiring high-speed communication such as image transmission is started by a user, setting of the requirement information (2162) is automatically changed to "emphasis on communication quality".

Subsequently, what communication parameters should be used in order to be determined as the connection policy information will be described. The information that can be obtained in accordance with the above requirements (1) to (5) is as follows.

Wireless Information (1-1) Types of Radio Transmission

First, information on the types of radio transmission is indispensable. To what wireless communication network they can be connected is obvious in each communication module (211 to 213).

(1-2) RSSI (Received Signal Strength Indicator)

This is information for estimating communication quality. Other parameters such as BER (Bit Error Rate) might be used depending on the type of radio transmission. They can be also obtained from each communication module (211 to 213) by known art.

(2) Communication Quality (End-to-End QoS)

(2-1) Delay, Delay Time of Communication (2-2) Jitter (2-3) Loss Rate

The above three items are information indispensable for ensuring a service quality. A required QoS level is different depending on the type of application. A required value of them can be obtained by known art in the application execution processing portion (221a) of the application executing device (22).

(2-4) Band of Access Point

This is a value specific to an access point. And this is a value derived from (1-1) type of radio transmission.

(2-5) Usable Band

This becomes dynamic information changing according to use states of other terminals at the access point.

(2-6) Number of Terminals Connected to an Access Point

This becomes an index indicating a congestion degree of an access point. It is sometimes difficult to measure an empty band, and the number of connected terminals is used as a parameter in many cases. The above two parameters are obtained from the access point side.

(2-7) Type of Application

This is required information since a required QoS level is different depending on the type of application. The application execution processing portion (221a) of the communication application executing device (22) can obtain the application in execution.

(3) Stability (3-1) Number of Terminals Connected to an Access Point

This becomes an index indicating a congestion degree of an access point. It is sometimes difficult to measure an empty band, and the number of connected terminals is used as a parameter in many cases.

(3-2) Location of Terminal

The location of a terminal can be obtained by providing a GPS receiving portion, not shown, in a communication terminal.

(3-3) Moving Speed

A moving speed of a terminal can be obtained by providing an acceleration sensor or the like in the communication terminal. It is possible to estimate how long the terminal can stay at the access point from the cover area.

(3-4) Cover Area

Time during which the terminal can stay at the wireless access can be estimated by combining a cover area of each wireless access, the above-mentioned location of the terminal, and the moving speed information. Map information of an area capable of communication of each wireless access is provided in a hard disk or the like in order to obtain this information.

(4) Cost (4-1) Communication Fee

A reference of an optimal wireless resource is considered to be a trade-off between the guaranteed QoS and the communication fee. Thus, fee information when each wireless resource is used is required. Specifically, the communication fee can be calculated from time counting means and a data table of a rate sheet.

(5) Power Consumption (5-1) Power Consumption of Communication Terminal When it is Connected to each Wireless Access This is information used in order to estimate time for which the communication terminal can be used from a battery capacity and power consumption of the communication terminal. Data of power consumption may be stored in advance, or means for actually measuring power consumption may be provided.

Processing by the connection policy information creation portion (2101b) of the present invention will be described.

This system is provided with architecture to maximize satisfaction according to preference of a user in an environment where the communication quality is dynamically changing. Here, the satisfaction of a user refers not to mere application QoS but also includes psychological satisfaction of the user. Therefore, how to quantify the satisfaction when a user uses a given wireless resource and reflect it in the connection policy information becomes a problem.

The above requirements cover a wide range from a type such as the communication fee that can be expressed in a graph with the satisfaction of a user to a type such as RSSI that can not be directly mapped with the satisfaction of a user. These types of information are roughly divided into four types, that is, communication quality, application QoS, subjective evaluation value, and user satisfaction.

Here, the communication quality refers to measurable quality information such as RSSI, delay, jitter, loss rate and the like.

The application QoS refers to quality information in an application layer such as S/N in a video application or the like.

The subjective evaluation value refers to a value evaluated by a human on the quality of an application. This is an evaluation reference closer to psychological satisfaction of a user than the application QoS since five senses of a human are used.

The user satisfaction is an evaluation value expressing subjective satisfaction, reflecting preference of each user.

By converting these types of information so that it can be mapped with the user satisfaction, all the information can be reflected in wireless resource selection.

In these four types of information, the communication quality and the application QoS are in a close relation, and many studies have been made for mutual conversion between the both. With regard to the subjective evaluation value, since a required value of the application QoS is generated in order to achieve a target MoS value, conversion of the both is also possible by accumulating subjective evaluation experiments.

The connection policy creation portion (2101b) can store known correlations of them in advance as conversion conditions and define them on the basis of the requirement.

Then, conversion of the user satisfaction and the subjective evaluation values becomes a remaining problem. The subjective evaluation is made in a measurement environment strictly defined by ITU-R or the like. However, in the case of video streaming, for example, some users are not satisfied by saying "what a poor image quality for that amount of fee", while other users are well satisfied by saying "how good the image quality is for a mobile" with video reproduction with the same evaluation point.

For example, a graph having the subjective evaluation value (MoS value) on the lateral axis and the satisfaction on the vertical axis is different depending on a user, and there can be various patterns as shown in FIG. 5. Suppose that the relation between the MoS value and the satisfaction of a given user is as shown in FIG. 5A. This represents that a value above a given MoS value as a threshold value indicates satisfaction, while a value below that indicates dissatisfaction. On the other hand, there might be a user having a milder graph as shown in FIG. 5B or a user having a high threshold value as in FIG. 5C.

In the connection policy creation portion (2101b), the correlation between satisfaction and MoS value is created for each user and each application so as to maximize the user satisfaction by reflecting it in the wireless resource selection.

In the data communication aggregation device (21), a selection algorithm as shown in FIG. 6 is used in order to select an optimal wireless resource according to preference of a user.

That is, in the data communication aggregation device (21), the required QoS of the application and the priority rank are set for each application to be executed by the communication application executing device (22), and they are stored in the requirement information (2162) of this device (21). First, the information on access points (60) capable of communication with each communication module (211 to 213) is obtained. Among them, since the access points e, f, g have RSSI falling under a predetermined threshold value, they are excluded from candidates.

On the other hand, required QoS is defined in advance for each application. This data may be stored in the data communication aggregation device (21) or may be stored in the communication application executing device (22) and transmitted to the data communication aggregation device (21) each time the application is executed through the local communication path. For example, a threshold value of each value such as delay, jitter and the like is determined for VoIP application (61).

In addition to a requirement (62) and a required QoS (64), a balance (63) of the above-mentioned user satisfaction is concentrated in the connection policy information creation portion (2101b), and the communication network is selected. For example, access points satisfying the required QoS are selected from usable access points as selection candidates and they are narrowed into the selection candidates matching the cost requirement and power consumption requirement of the user.

In the connection policy information creation portion (2101b), according to a use state of frequency or degree of wave interference detected by a frequency measurement portion (2103b) as shown in FIG. 7, processing to lower the priority rank of a congested band can be executed or policy information can be generated in a distributed manner so that selection does not concentrate to a single communication network.

If two or more selection candidates remain, the balance (63) is considered, and if the satisfaction is improved by a predetermined value or more with a predetermined cost fluctuation margin, the more preferable one is selected.

The connection policy information creation portion (2101b) selects (65) the access point b by the above algorithm, for example, in the case of a VoIP application and selects (67) a link aggregation by access points a+b+d in the case of a video application (66). The result selected as above is stored in the connection policy information table (2161).

Then, when the network control portion (2101a) obtains the application in execution and information of the access point usable at that time from the communication application executing device (22), the portion searches a combination of the application and the usable access point from the connection policy information table (2161) so as to determine a wireless communication network. The determined wireless communication network commands reconfiguration execution processing to the network reconfiguration execution processing portion (2102a) and starts communication in the corresponding communication module (211 to 213).

Subsequently, the network reconfiguration processing will be described in detail.

As a simple and convenient embodiment of the present invention, a technology relating to switching of networks such as an existing handover technology can be used as appropriate for the network reconfiguration processing. Also, a technology to switch a combination of the communication networks to be linked by link aggregation can be applied as will be described later. Since they are known technologies, the configuration of the network reconfiguration execution processing portion (2102a) of the present invention can be designed as appropriate.

Example 2

The configuration of the present invention is as mentioned above, and a configuration to evaluate the result and to update the connection policy information (2161) after the network reconfiguration will be described below.

FIG. 7 is a configuration diagram of this device (21') at this time and FIG. 8 is a processing flowchart.

In addition to the above example, a connection policy information evaluation portion (2101c) is provided in the communication network reconfiguration management means (2101), and after the communication network reconfiguration execution processing (S12), a communication network measurement information collection step (S13) by a measurement information collection portion (2103a) and the frequency measurement portion (2103b), a connection policy information evaluation step (S14) by the connection policy information evaluation portion (2101c), and a connection policy information update step (S15) by the connection policy information creation portion (2101b) are provided.

Specifically, the communication is actually conducted by the communication network selected in the network control portion, and the communication parameters at that time are measured. It is compared and evaluated if the values satisfy the requirement information (2162) or not or are contained in a predetermined threshold value from the requirement information (2162) or not, and if not contained, the measured values are re-calculated in the connection policy information creation portion (2101b), and the connection policy information table (2161) is updated.

For example, it is evaluated if the QoS of the application executed in the communication application executing device (22) has been obtained or not, and if not, another communication network is selected or update is made to the connection policy information in which a combination of link aggregation is changed.

Example 3

Moreover, in the present invention, as shown in FIG. 9, a plurality of communication application executing devices (22) (22) (22) may be provided for a single data communication aggregation device (24). A specific image of this mode is that one unit of the data communication aggregation device (21) is installed at a work place or home, a plurality of communication application executing devices (22) used by each user are connected to it, and a communication line used in communication with the data communication aggregation device (21) is shared.

The data communication aggregation device (24) shown in FIG. 10 may carry out processing so that a required value integration processing portion (240) for integrating values of the communication parameters required in each communication application executing device (22) is provided so as to satisfy the request of the application executed by each communication application executing device.

For example, if a required communication speed in moving image reproduction by a given communication application executing device (22) is 1 Mbps, when another communication application executing device (22) starts connection with the data communication aggregation device (24) and the communication speed of 0.5 Mbps is needed, processing is carried out so that another link is established in the case where the data communication aggregation device (24) cannot obtain the communication speed of 1.5 Mbps with the current link only.

In this example, the total value of the communication speed is calculated, but it may be a maximum value or an average value. Also, if there is a requirement for a packet loss rate, a minimum value is preferably selected as an integrated value.

As mentioned above, processing of the required value integration processing portion (240) can calculate a statistic value or a required value by a predetermined calculation equation according to the characteristic of the communication parameter or such that the selection actually becomes appropriate.

As mentioned above, when the plurality of communication application executing device (22) is used, the data communication aggregation device (21) might need sorting of the wireless communication network to be used according to the application.

In this case, the application in execution can be obtained by each communication application executing device (22) in some cases by examining an IP address or a port number to be used of an external server to be connected.

Such technologies are known, and since a router having a traffic-load distribution function carries out sorting to specific servers or another router for each application, transmission is made earlier than the other packets in cueing of an application (voice or the like) with higher priority of transferring processing.

Also, in a traffic monitoring device, a technology to obtain the type of application is used as a technology to grasp which application is used in an organization to what degree.

Moreover, in setting of a firewall, a function to identify application is provided, and discrimination is made by a port number or the like in this case. The port numbers are determined as well-known ports, and a list of them is described in Non-Patent Document 7, for example.

Non-Patent Document 7: Home page http://www.iana.org/assignments/port-numbers

In the present invention, using these technologies, an appropriate wireless communication network can be selected according to the application in execution on the basis of the requirement information (2162).

Direct notification may be made from each communication application executing device (22) through the local communication path (23).

The data communication aggregation device (24) according to this configuration may be configured integrally with a wireless LAN router. The wireless LAN router is provided with a function to give an IP address or the like by a DHCP server function to user terminals connected through the wireless LAN in addition to a known router function. While these functions are provided, instead of connection to a single network as in an existing wireless LAN router, a wireless LAN router may be provided to which the configuration of the present invention that connection is made while the plurality of wireless communication networks are dynamically reconfigured is applied.

The present invention with the above configuration has the following industrial applicability. That is, if a regular communication line is disconnected at occurrence of a disaster or the like, since the data communication aggregation device accommodates data communication devices for satellite communication or other usable wide-area/far distance communications, a stable wide-area communication can be provided using a usable methods to the maximum, and thus, disaster victims in the vicinity can continue communication till recovery. Also, if a new communication band is needed temporarily for an event or the like, by installing the data communication aggregation devices as access points, communication with higher communication speed or larger capacity of users can be provided to users.

Moreover, the present invention can be implemented as a function of a household wireless LAN router so that a request for a communication application to be executed or an optimal connection destination can be automatically selected according to a request of a communication cost.

EXPLANATION OF REFERENCE NUMERALS

Figure 1:
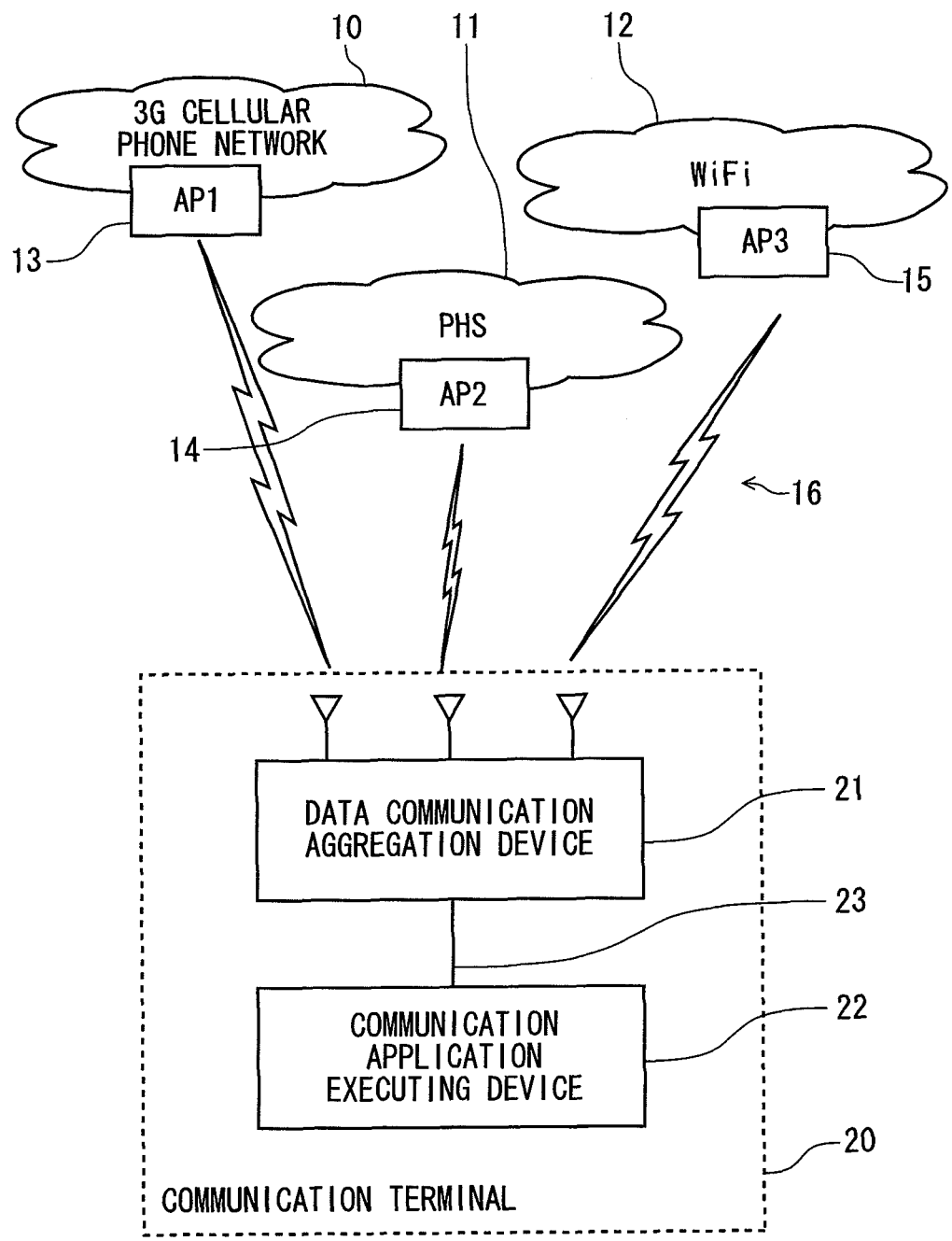
FIG. 1 is an entire configuration diagram of a communication network system according to the present invention.
Figure 2:
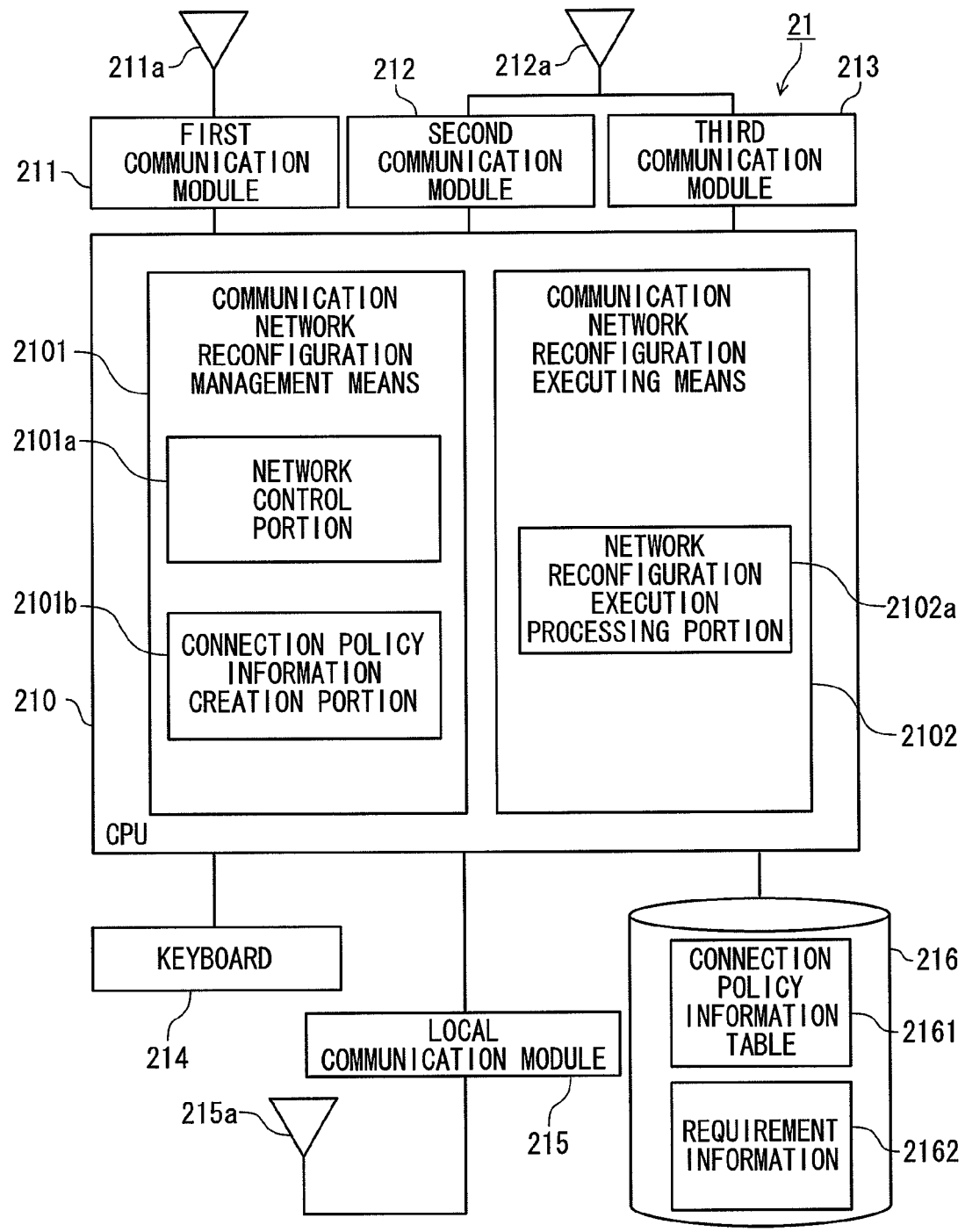
FIG. 2 is a configuration diagram of a data communication aggregation device in the present invention.
Figure 3:
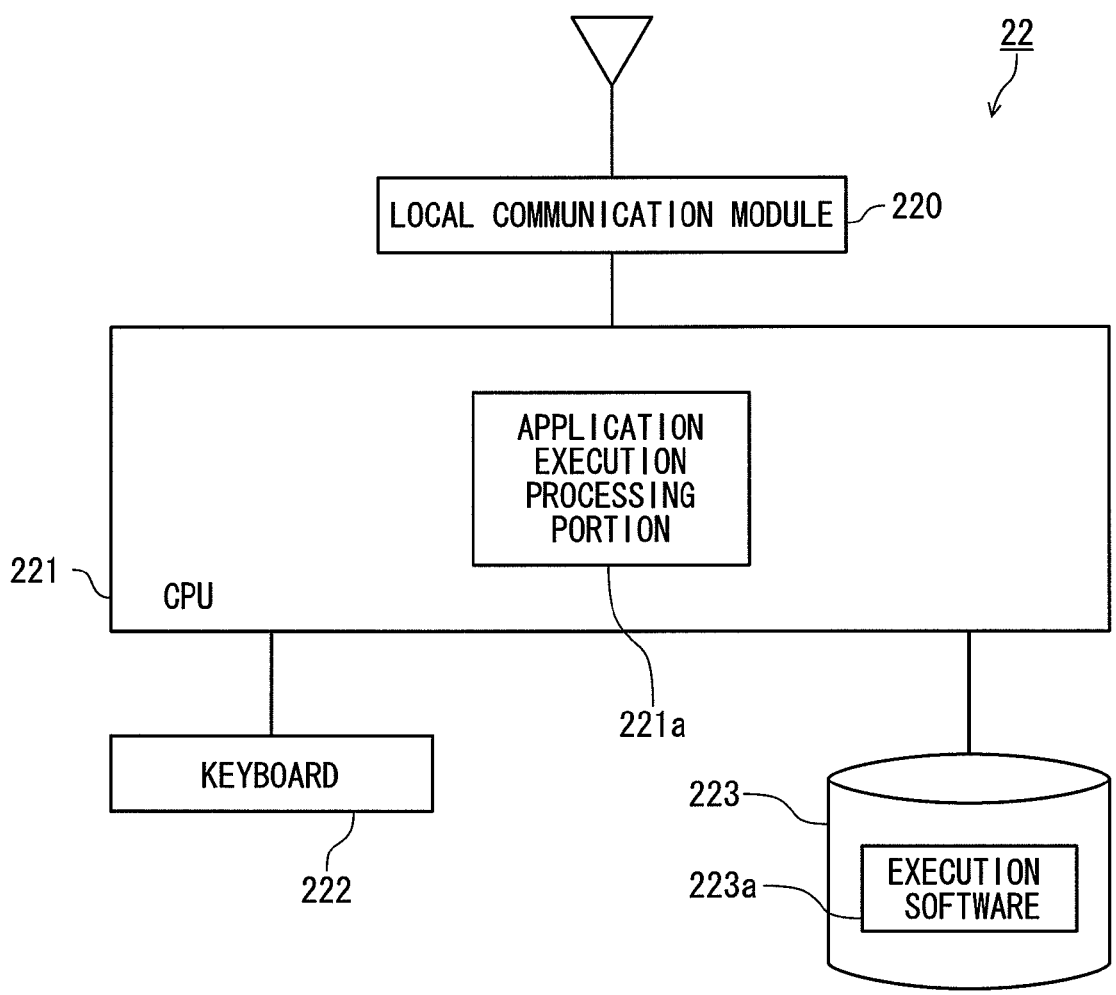
FIG. 3 is a configuration diagram of a communication application executing device in the present invention.
Figure 4:
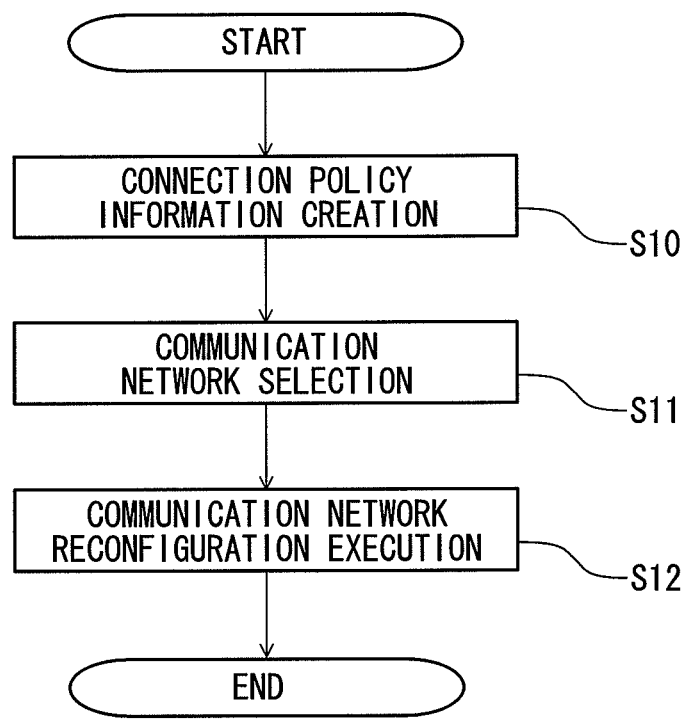
FIG. 4 is a processing flowchart in the data communication aggregation device in the present invention.
Figure 5A:
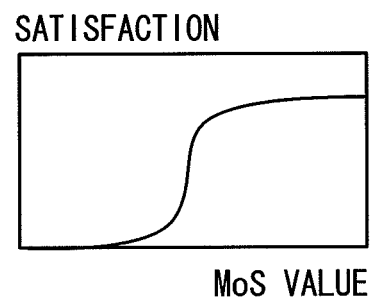
FIGS. 5A-5C are graphs illustrating relations between subjective evaluation values (MoS values) and satisfaction.
Figure 5B:
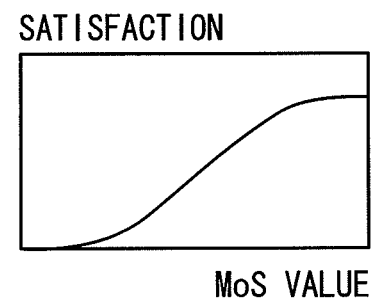
Figure 5C:
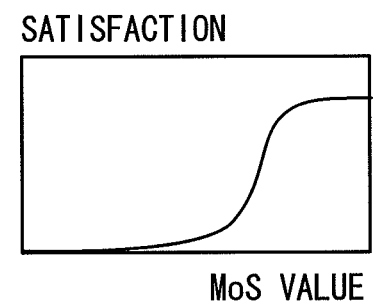
Figure 6:
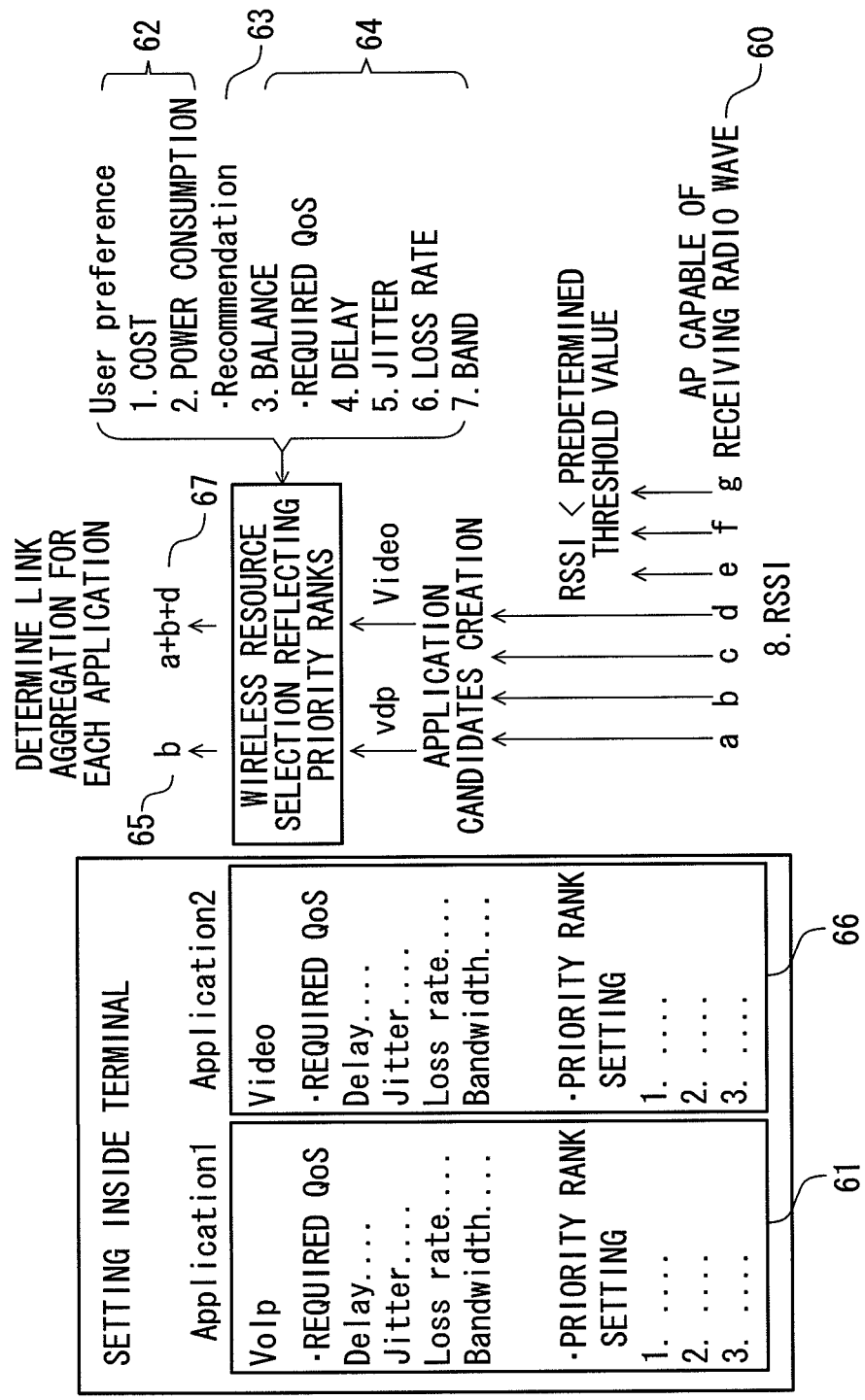
FIG. 6 is a selection algorithm of a wireless resource according to preference of a user.
Figure 7:
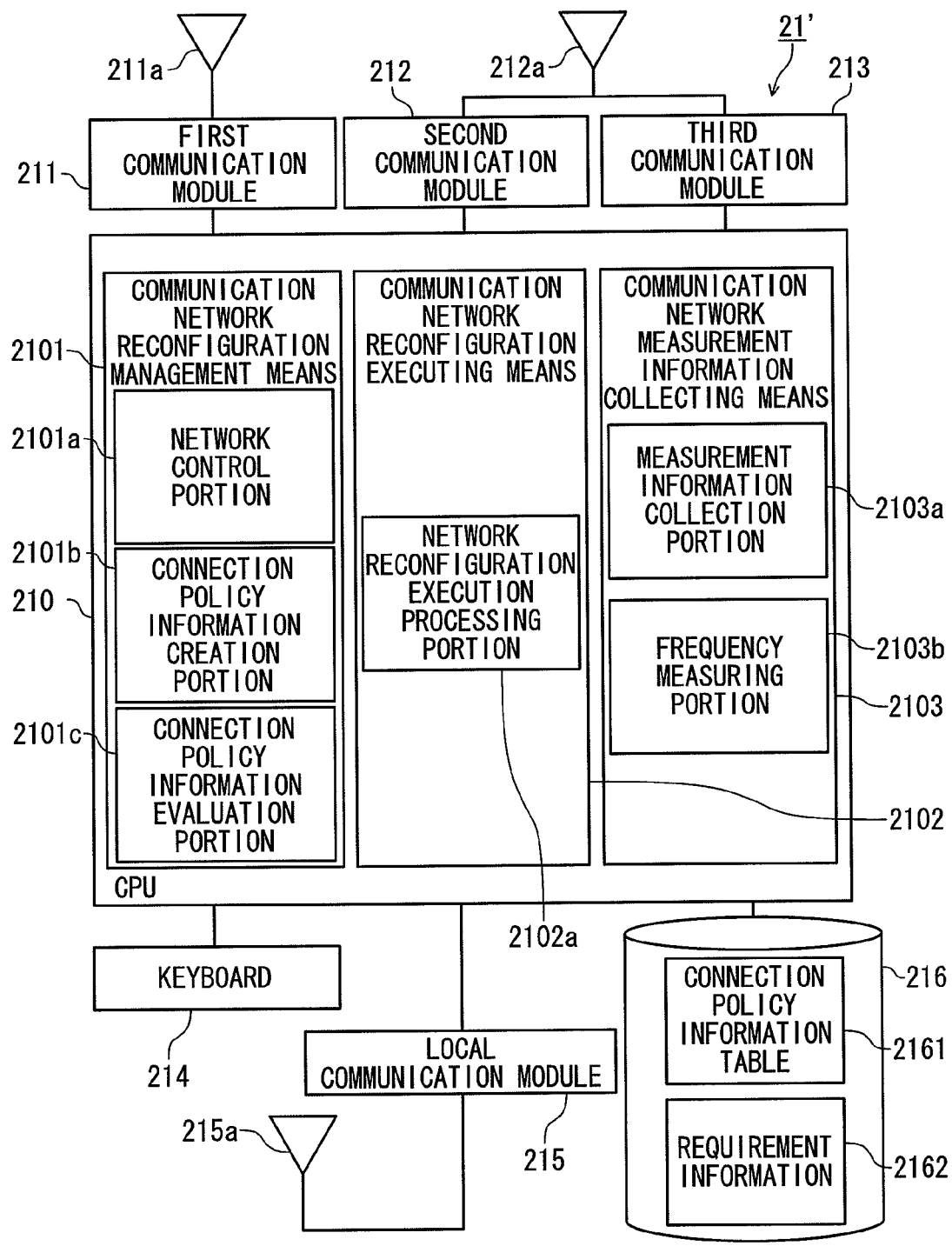
FIG. 7 is another configuration diagram of the data communication aggregation device in the present invention.
Figure 8:
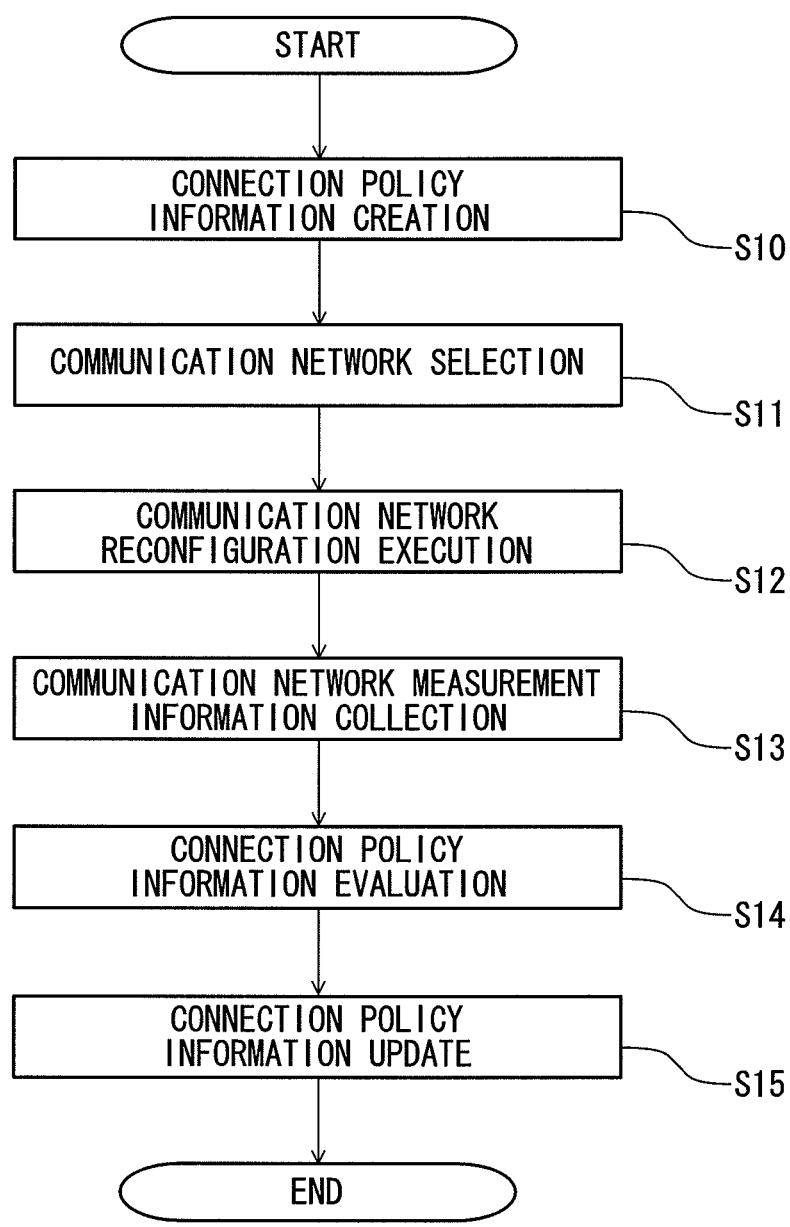
FIG. 8 is a processing flowchart of the present invention (Example 2).
Figure 9:
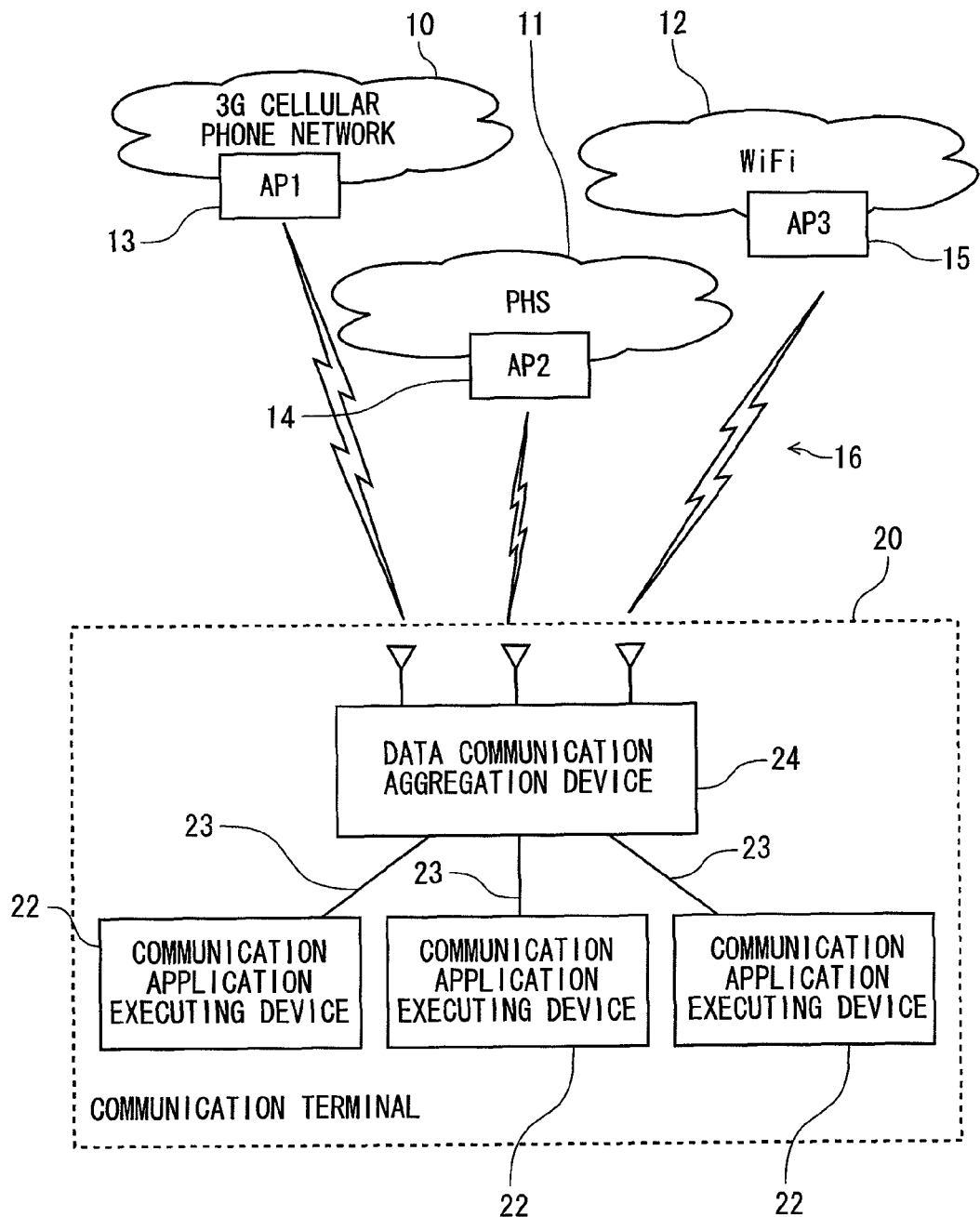
FIG. 9 is an entire configuration diagram of the communication network system (Example 3) according to the present invention.
Figure 10:
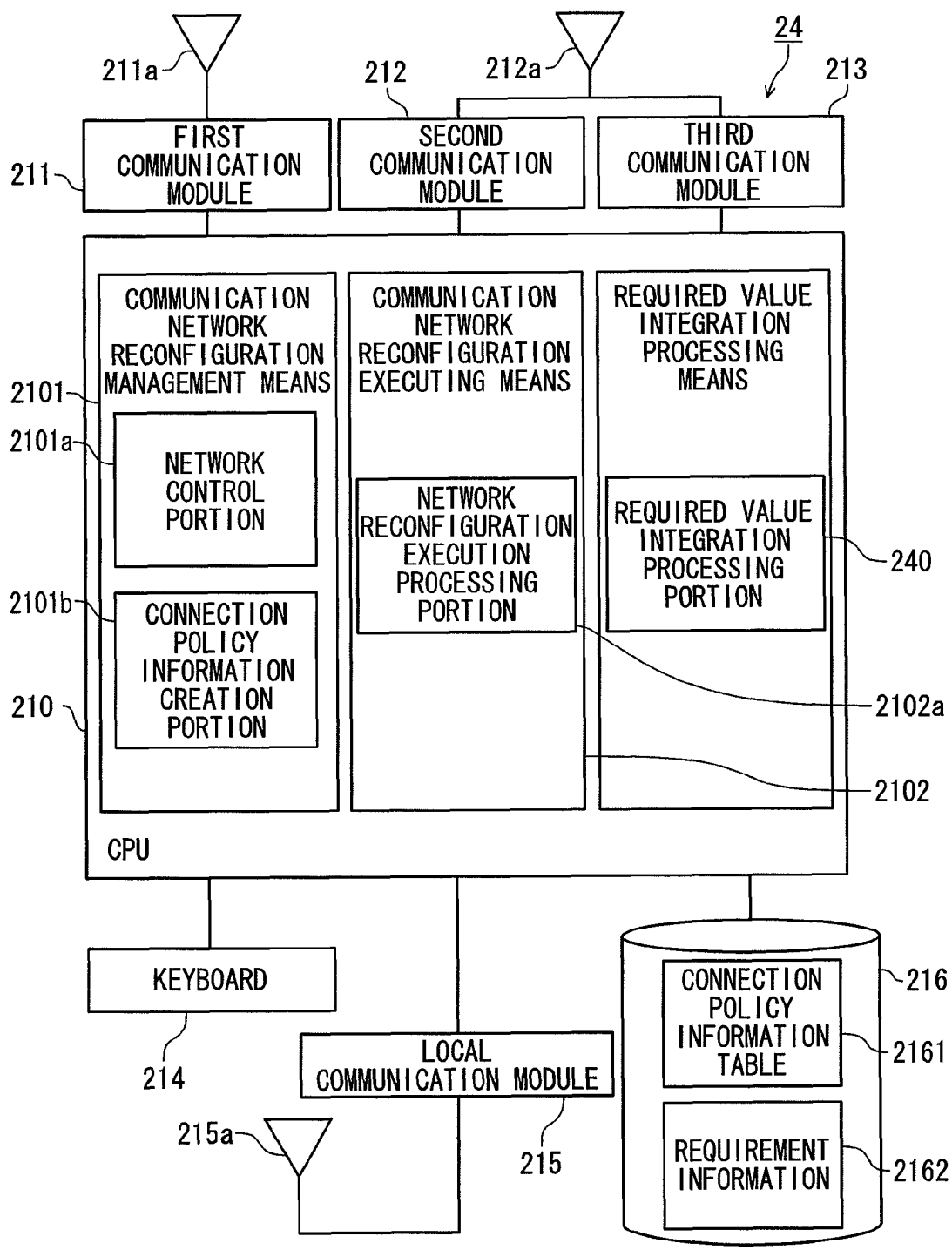
FIG. 10 is a configuration diagram of the data communication aggregation device (Example 3) in the present invention.

10: 3G cellular phone network
11: PHS
12: WiFi (wireless LAN)
13: access point 1
14: access point 2
15: access point 3
16: wireless communication network
20: communication terminal
21: data communication aggregation device
22: communication application executing device
23: local communication path

The invention claimed is:

1. A communication terminal capable of dynamic reconfiguration of its connection method, including presence/absence of a connection, to a plurality of wireless communication networks, comprising:
  a data communication aggregation device, at least one communication application executing device, and a local communication path for communications between the data communication aggregation device and the communication application executing device, characterized in that:
  the data communication aggregation device is provided with:
  a single or a plurality of communicating means corresponding to the plurality of wireless communication networks configured physically or logically;
  first local communication means for communicating with the communication application executing device through the local communication path; and
  a required value integration processing means for integrating values of communication parameters required in each of the at least one communication application executing device, wherein the values are aggregated and communication links selectively aggregated independently of the number of applications currently being executed; and
  the communication application executing device is provided with:
  second local communicating means for communicating with the data communication aggregation device through the local communication path; and
  application executing means for executing an application for communicating at least with an outside communication network;
  wherein the at least one communication application executing device includes a handheld user device, and the data communication aggregation device is separate from said handheld user device.

2. The communication terminal according to claim 1, wherein the data communication aggregation device is provided with:
  a connection policy information table stored in storage means;
  communication network reconfiguration management means for selecting a connection method to a wireless communication network on the basis at least of the connection policy information table; and
  communication network reconfiguration executing means for reconfiguring connection to the selected connection method.

3. The communication terminal according to claim 1, wherein communication network reconfiguration management means is provided with a connection policy information creation portion for creating a connection policy information table, using requirement information inputted from input means or stored in a storage means relating to a predetermined communication parameter in the wireless communication network, on the basis of the requirement information.

4. The communication terminal according to claim 3, wherein said predetermined communication parameter is one of or combination of a communication speed, a communication amount, a line load, a packet loss rate, communication delay, jitter, radio-wave intensity, communication fee, or a value calculated by a predetermined calculation equation from values of these parameters.

5. The communication terminal according to claim 3, wherein the data communication aggregation device is provided with a communication network measurement information collecting means for extracting at least any of information on said predetermined communication parameters from each wireless communication network;
  said communication network reconfiguration management means is provided with a connection policy information evaluation portion for evaluating contents of said connection policy information table on the basis of the information collected by the communication network measurement information collecting means; and
  said connection policy information creation portion updates said connection policy information table according to the evaluation.

6. The communication terminal according to claim 3, wherein the data communication aggregation device is provided with frequency measuring means for measuring a use state of a frequency by each wireless communication network; and
  said connection policy information creation portion updates said connection policy information table according to the use state of the frequency.

7. The communication terminal according to claim 1, wherein a plurality of communication application executing devices are provided in the data communication aggregation device in said communication terminal so that the data communication aggregation device operates for each communication application executing device.

8. A communication network system comprising:
the communication terminal according to claim 1;
said plurality of wireless communication networks; and
a plurality of server devices connected through the wireless communication networks.

9. The communication terminal according to claim 1, wherein the handheld user device is configured to communicate wirelessly with the data communication aggregation device.

* * * * *